United States Patent [19]

Seki et al.

[11] Patent Number: 4,889,580

[45] Date of Patent: Dec. 26, 1989

[54] DOUBLE FACER

[75] Inventors: Yukuharu Seki; Noriyasu Haraguchi, both of Mihara, Japan

[73] Assignee: Mitsubishi Jukogyo Kabushiki Kaisha, Hiroshima, Japan

[21] Appl. No.: 160,414

[22] Filed: Feb. 25, 1988

[30] Foreign Application Priority Data

Mar. 2, 1987 [JP] Japan ............................ 62-28813[U]

[51] Int. Cl.[4] ............................................... B32B 11/06

[52] U.S. Cl. .................................... 156/382; 156/210; 156/285; 156/470

[58] Field of Search ............... 156/205, 208, 206, 207, 156/382, 497, 470, 360, 391, 583.5, 285, 471, 472, 473, 583.3, 555; 34/162; 100/151, 154, 211, 269 R, 93 RP; 425/363, 371, 372

[56] References Cited

U.S. PATENT DOCUMENTS

| | | | |
|---|---|---|---|
| 3,319,353 | 5/1967 | Matsunami | 34/162 |
| 3,620,158 | 7/1969 | Torelli et al. | 100/154 |
| 3,861,056 | 1/1975 | Wittstock et al. | 34/54 |
| 4,169,007 | 9/1979 | Pray | 156/210 |
| 4,365,548 | 12/1982 | Pankoke | 100/154 |
| 4,384,516 | 5/1983 | Pankoke | 100/154 |
| 4,556,444 | 12/1985 | Schommler | 34/162 |
| 4,711,168 | 12/1987 | Held | 100/154 |

*Primary Examiner*—David Simmons
*Assistant Examiner*—Gregory J. Wilber
*Attorney, Agent, or Firm*—Bernard, Rothwell & Brown

[57] ABSTRACT

The known double facer of the type that when a single-faced cardboard sheet and a liner are being pinched and conveyed by a belt on the upper side and a heating box on the lower side, pressurized air is fed from an air chamber onto the back side of the belt to press the single-faced corrugated cardboard sheet and the liner onto the side of the heating box and thereby the single-faced corrugated cardboard sheet and the liner are made to stick to each other, is improved in that the side walls of the air chamber are supported in a movable manner in the widthwise direction of the sheet so that the width of the air chamber can be adjusted according to the width of the corrugated cardboard sheet to be produced to avoid the side edge portions of the corrugated cardboard sheet from crushing and insufficiently sticking. This results in reduction of unacceptable sheet products and economy of a driving power expense.

3 Claims, 3 Drawing Sheets

DOUBLE FACER

BACKGROUND OF THE INVENTION

1. Field of the Invention

The present invention relates to a double facer in a corrugate machine.

2. Description of the Prior Art

At first, one example of a double facer in a corrugate machine in the prior art will be described with reference to FIGS. 5, 6 and 7. In FIG. 7, reference numeral (026) designates a double facer in a corrugate machine, and this double facer (026) is composed of a heating part (024) and a cooling part (025). Reference numeral (01) designates a single-faced corrugated cardboard sheet or sheets produced by a single facer (not shown) in the preceding step of the process, numeral (02) designates a liner, numeral (03) in FIGS. 5, 7 and 8 designates a blower, numeral (06) designates an air chamber provided in the above-mentioned heating part (024), numeral (05) designates a pressurized air feed pipe extending from the same blower to the air chamber (06), numeral (04) designates pressurized air, numeral (07) designates an upper side canvas belt provided over the aforementioned heating part (024) and the above-mentioned cooling part (025), numeral (08) designates a corrugated cardboard sheet, numeral (010) designates a sheet introducing section, numeral (011) designates a lower side heating box (hot plate section) provided in the above-mentioned heating part (024), and the interior of this heating box (011) is adapted to be heated by steam. In addition, reference numeral (027) in FIG. 7 designates a lower side conveyor belt provided in the cooling part (025), numeral (028) designates press rollers provided in the same cooling roller, numeral (029) designates a gluing machine, numeral (030) designates a preheat roller, and after the liner (02) has passed through the gluing machine (029), it is preheated and conditioned by the preheat roller (03) and fed to the lower side heating box (hot plate section) (011). On the other hand, after the single-faced corrugated cardboard sheet or sheets (01) have passed through the gluing machine (029), they join with the liner (02) at the sheet introducing section (010), and thereafter they come into contact with the upper side canvas belt (07) and are sent to the heating part (024). In other words, the single-faced corrugated cardboard sheets (01) and the liner (02) are held in contact with the upper side canvas belt (07) and the lower side heating box (011) and thus pinched and conveyed thereby through the heating part (024). At this moment, the pressurized air (04) is fed through the route of the blower (03) → the pressurized air fed pipe (05) → the interior of the air chamber (06), further it is fed from the air chamber (06) onto the back side of the canvas belt (07), thereby the single-faced corrugated cardboard sheet (01) and the liner (02) are pressed towards the heating box (011), and crest portions (09) of the corrugations of the single-faced cardboard sheet (01) and the liner (02) are made to stick to each other by paste (031) applied to the crest portions (09) of the corrugations as shown in FIG. 9. Subsequently, they enter the cooling part (025), where they are conveyed by the canvas belt (07) on the upper side and the conveyor belt (027) on the lower side, during this period they are again pressed via the press rollers (028) and the canvas belt (07) and thereby formed into a corrugated cardboard sheet (08), and then the corrugated cardboard sheet (08) is sent to the next step of the process.

In the heretofore known double facer shown in FIGS. 5, 6 and 7, during the period when the single-faced corrugated cardboard sheet (01) is passing through the gap between the air chamber (06) and the heating box (011), the both side edge portions of the single-faced corrugated cardboard sheet (01) directed in its lengthwise direction having a small crush-resistance are crushed by the air pressure applied by the air chamber (06) and the weight of the both side edge portions of the canvas belt (07) directed in its lengthwise direction tend to sag (See portion (A) in FIGS. 8 and 9). Especially, in the case where the size of the corrugated cardboard boxes being manufactured is small and so a single-faced corrugated cardboard sheet having a narrow width has been fed, the above-mentioned tendency is so remarkable that gap clearances are produced between the side walls of the air chamber (06) and the both side edge portions of the canvas belt (07) directed in its lengthwise direction and the pressurized air (04) leaks out through these gap clearances (See FIG. 8), hence the pressing force exerted upon the both side edge portions of the single-faced corrugated cardboard sheet (01) directed in its lengthwise direction at the both side edge portion of the canvas belt (07) is reduced, and therefore, unacceptable products are produced due to the fact that the both side edge portions of the single-faced corrugated cardboard sheet (01) directed in its lengthwise direction and the liner (02) cannot well stick to each other. Furthermore, since the pressurized air (04) leaks out, it was necessary to use a blower (03) having a large capacity, and so, there was a problem that a driving power expense was unfavorably increased.

SUMMARY OF THE INVENTION

It is therefore one object of the present invention to provide an improved double facer, in which pressurized air would not leak out through a gap between a side wall of an air chamber and a belt on the upper side, hence production of unacceptable products can be prevented, and moreover, a driving power expense for a pressurized air feed source can be economized.

According to one feature of the present invention, there is provided a double facer of the type that when a single-faced corrugated cardboard sheet and a liner are being pinched and conveyed by a belt on the upper side and a heating box on the lower side, pressurized air is fed from an air chamber onto the back side of the same belt to press the single-faced corrugated cardboard sheet and the liner onto the side of the heating box and thereby the single-faced corrugated cardboard sheet and the liner are made to stick to each other, improved in that side walls of the above-mentioned air chamber are supported in a movable manner in the widthwise direction of the sheet.

In operation of the double facer according to the present invention constructed in the above-described manner, in the case where the size of the corrugated cardboard boxes being manufactured is small and hence a singlefaced corrugated cardboard sheet having a narrow width is fed into the gap between the belt on the upper side and the heating box on the lower side, the side walls of the air chamber arc moved in the widthwise directions so as to adapt to the width size of the single-faced corrugated cardboard sheet and thereby the size of the air chamber in the widthwise direction is reduced, whereas in the case where the size of the corrugated cardboard boxes being manufactured is large and so a single-faced corrugated cardboard sheet having a broad width is fed, the side walls of the air chamber are moved in the opposite widthwise directions so as to adapt to the width size of the single-faced corrugated cardboard sheet and thereby the size of the air chamber in the widthwise direction is enlarged.

According to the present invention, owing to the above-described improved construction and operation of the double facer, the pressurized air would not leak out through the gaps between the side walls of the air chamber and the belt on the upper side, and so, production of unacceptable products can be prevented. In addition, there is an advantage that since leakage of the pressurized air as described above can be eliminated, a driving power expense for the pressurized air feed source can be economized.

The above-mentioned and other objects, features and advantages of the present invention will become more apparent by reference to the following description of one preferred embodiment of the present invention taken in conjunction with the accompanying drawings.

DESCRIPTION OF THE PREFERRED EMBODIMENT

Figure 1:
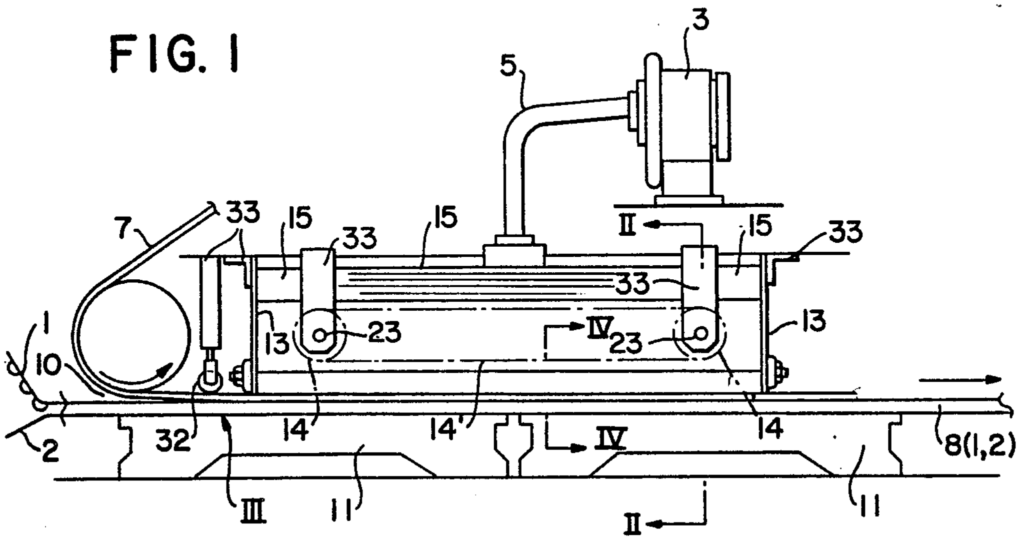
FIG. 1 is a side view showing one preferred embodiment of the double facer according to the present invention.
Figure 2:
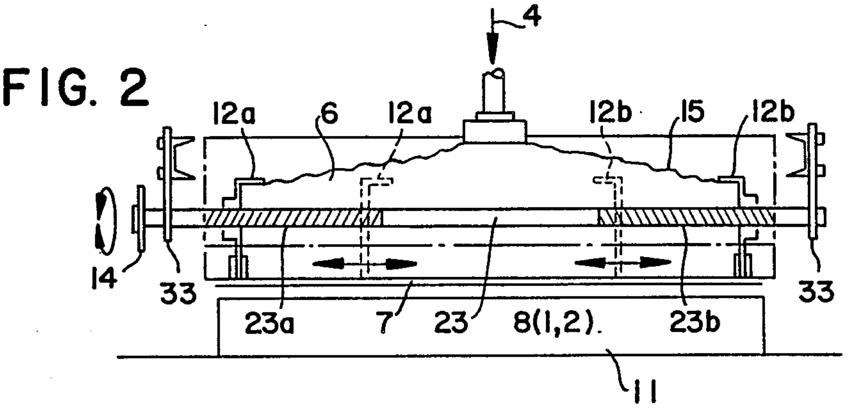
FIG. 2 is a vertical cross-section front view taken along line II—II in FIG. 1 as viewed in the direction of arrows.
Figure 3:
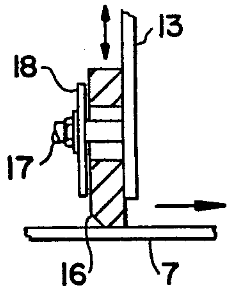
FIG. 3 is an enlarged side view of a portion denoted by an arrow III in FIG. 1.
Figure 4:
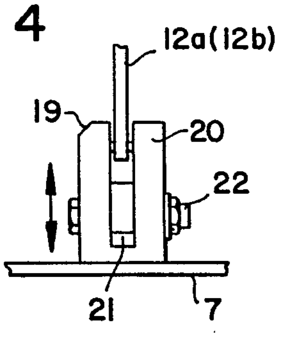
FIG. 4 is an enlarged partial front view taken along line IV—IV in FIG. 1 as viewed in the direction of arrows.
Figure 5:
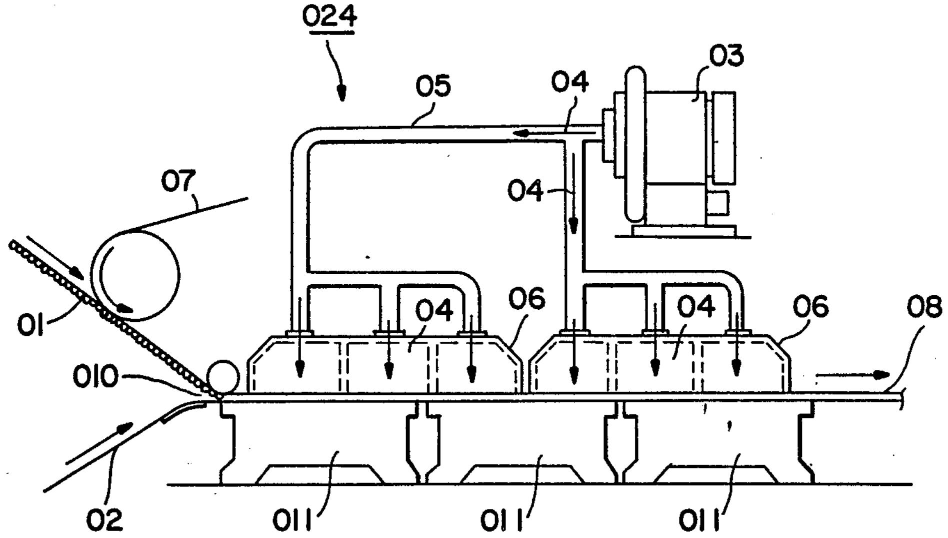
FIG. 5 PRIOR ART
FIG. 5 is a side view showing a double facer in the prior art.
Figure 6:
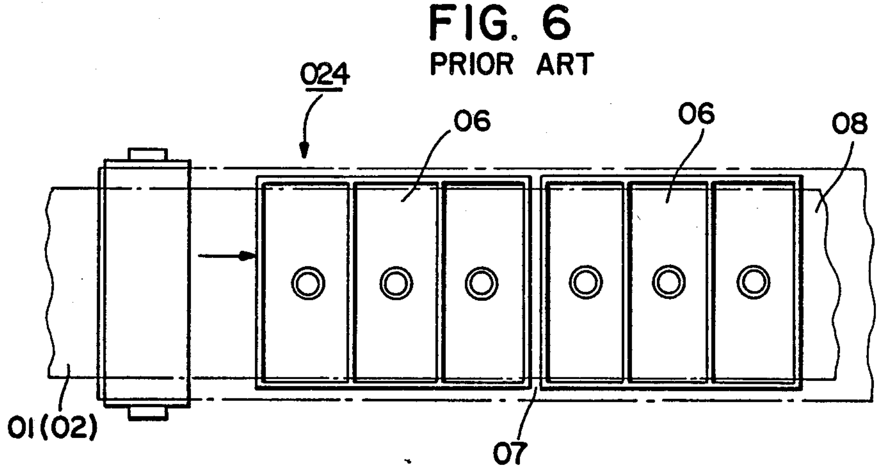
FIG. 6 PRIOR ART
FIG. 6 is a plan view of the same double facer.
Figure 7:
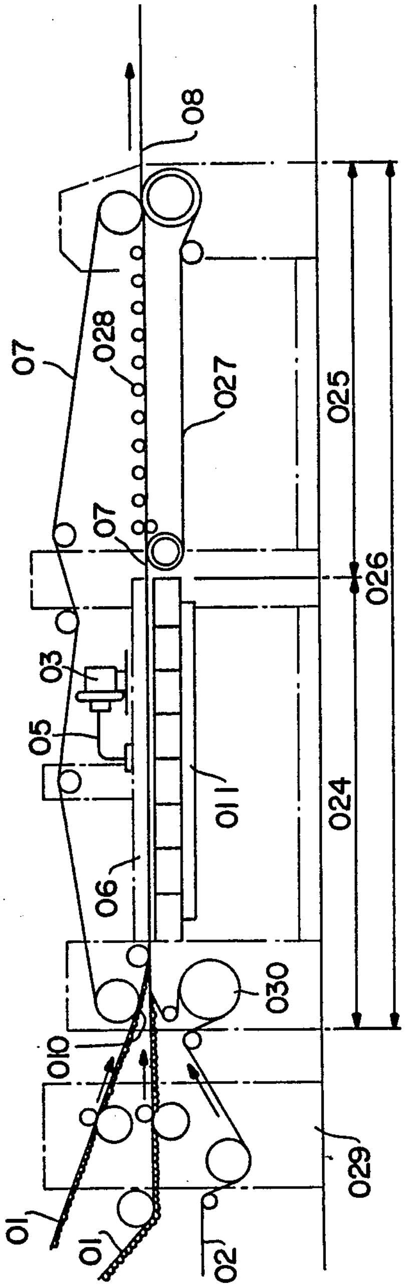
FIG. 7 PRIOR ART
FIG. 7 is a side view showing the entire construction of the double facer.
Figure 9:
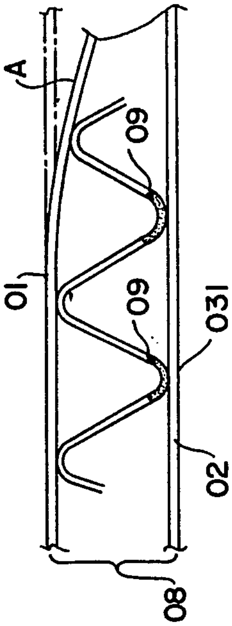
FIG. 9 PRIOR ART
FIG. 9 is a diagrammatic partial view showing a crushed and sagging portion produced at the side edge portion of a single-faced corrugated cardboard sheet directed in its lengthwise direction.
Figure 8:
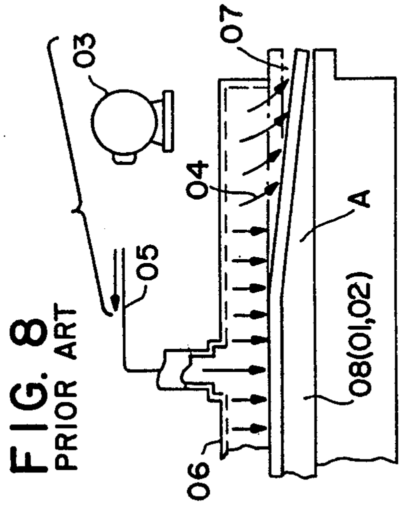
FIG. 8 PRIOR ART
FIG. 8 is a diagrammatic partial view showing a leaking state of pressurized air.

Now description will be made on one preferred embodiment of the double facer according to the present invention with reference to FIGS. 1 to 4. In these figures, reference numeral (1) designates a single-faced corrugated cardboard sheet produced by a single facer (not shown) in the preceding step of the process, numeral (2) designates a liner, numeral (3) designates a blower, numeral (6) designates an air chamber provided in a heating part (See (024) in FIG. 7), numeral (5) designates a pressurized air feed pipe extending from the blower (3) to the air chamber (6), numeral (4) designates pressurized air, numeral (7) designates a canvas belt on the upper side which is disposed so as to extend over the above-mentioned heating part and a cooling part (See (025) in FIG. 7), numeral (8) designates a corrugated cardboard sheet, numeral (10) designates a sheet introducing section, numeral (11) designates heating box on the lower side (hot plate section) that is provided in the above-mentioned heating part, numerals (12*a*) and (12*b*) respectively designate left and right side walls of the air chamber (6), numeral (23) designates feed screw shafts disposed at the front and rear positions, and the opposite end portions of each feed screw shaft (23) are rotatably supported by members (33) which are integral with a machine frame. Reference numerals (23*a*) and (23*b*) designate a left-hand thread portion and a right-hand thread portion, respectively, provided at the left and right wing portions of each feed screw shaft (23), numeral (14) designates sprockets fixedly secured to one end portions of the respective feed screw shafts (23), numeral (14') designates a chain mounted between the respective sprockets (14), female screw portions provided in the bosses of the above-mentioned left and right side walls (12*a*) and (12*b*), respectively, are threadedly engaged with the left-hand thread portion (23*a*) and the right-hand thread portion (23*b*) of the respective feed screw shafts (23), hence when one of the feed screw shafts (23) is rotated, the respective feed screw shafts (23) coupled via the sprockets (14) and the chain (14') would rotate synchronously, the rotation is transmitted to the left and right side walls (12*a*) and (12*b*), hence these left and right side walls (12*a*) and (12*b*) would move in the left and right directions so as to approach to each other or separate from each other, at the same time the bellows (15) would expand or contract, and thereby the dimension in the left and right directions of the air chamber (6) (the dimension in the widthwise direction of the corrugated cardboard sheet (8)) can be adjusted. In addition, reference numerals (19) and (20) in FIG. 4 designate a pair of air-sealing plates which are mounted in a vertically movable manner to the bottom end portions of the left and right side walls (12*a*) and (12*b*) by means of a spacer (21) and a plurality of bolts (22), and these air-sealing plates (19) and (20) are slidably held in contact with the canvas belt (7), so that the gaps between the left and right side walls (12*a*), (12*b*) and the canvas belt (17) can be air-tightly sealed. It is to be noted that the above-referred respective bolts (22) also serve as a weight for preventing float-up of the air-sealing plates (19) and (20). As referred to above, reference numeral (15) designates bellows that is expansible in the left and right directions, the both left and right side edge portions of this bellows (15) are fixedly secured to the top edge portions of the above-described left and right side walls (12*a*) and (12*b*), and the tip end portion of the above-referred pressurized air feed pipe (5) is mounted to a central portion of the same bellows (15). In addition, reference numeral (13) designates front and rear side walls which are slidably held in contact with the front and rear side portions of the same bellows (15), and the top end portions of these front and rear side walls (13) are fixedly secured to the member (33) that is integral with the machine frame. In this way, the bellows covers the upper portion of the canvas belt (7) on the upper side. Furthermore, reference numeral (16) in FIG. 3 designates air-sealing plates mounted in a vertically movable manner to the bottom end portions of the front and rear side walls (13) by means of a guide plate (18) and a plurality of stud bolts (17), and these air-sealing plates (16) are slidably held in contact with the canvas belt (7), so that the gaps between the front and rear side walls (13) and the canvas belt (7) can be air-tightly sealed. In addition, reference numeral (32) designates guide rollers disposed just in front of the front side wall (13), and these guide rollers (32) are rotatably mounted to the member (33) that is integral with the machine frame. It is to be noted that the reason why the air-sealing plates (19) and (20) are mounted in a vertically movable manner to the bottom end portions of the left and right side walls (12*a*) and (12*b*) and the air sealing plates (16) are mounted in a vertically movable manner to the bottom end portions of the front and rear side walls (13), is because it was contemplated to realize perfect sealing between the respective side walls and the canvas belt (7) even if a joining portion (lacing portion) of the canvas belt (7) should come to these side walls, or even if a thickness or thicknesses of the corrugated cardboard sheet (8) (the single-faced corrugated cardboard sheet (1) and the liner (2)) should vary.

Now the operation of the double facer shown in FIGS. 1 to 4 will be explained in more detail. After the liner (2) has passed a gluing machine, it is preheated and conditioned by a preheat roller and then fed to the heating box (hot plate section) (11) on the lower side. On the other hand, after the single-faced corrugated cardboard sheet (1) produced by a single facer (not shown) in the preceding step of the process has passed the gluing machine, it joins with the liner (2) in the sheet introducing section (10), and thereafter they are sent to the heating part as held in contact with the canvas belt (7) on the upper side. In other words, the single-faced corrugated cardboard sheet (1) and the liner (2) are pinched and conveyed through the heating part as held in contact with the canvas belt (7) on the upper side and the heating box (11) on the lower side. During this period, the pressurized air (4) is fed to the interior of the air chamber (6) through the route of the blower (3) → the pressurized air feed pipe (5) → the air chamber (6), further the pressurized air is sent from the interior of the air chamber (6) to the back side of the canvas belt (7), hence the single-faced corrugated cardboard sheet (1) and the liner (2) are pressed against the heating box (11), thereby the crest portions of the corrugations of the single-faced corrugated cardboard sheet (1) and the liner (2) are made to stick to each other by paste applied to these crest portions of the corrugations, and subsequently they are fed to the cooling part. In the case where the size of the corrugated cardboard boxes being manufactured is small and hence a single-faced corrugated cardboard sheet (1) having a narrow width is fed, one of the fed screw shafts (23) is rotated, thereby the respective feed screw shafts (23) coupled via the sprockets (14) and the chain (14') are rotated synchronously, these rotations are transmitted to the left and right side walls (12*a*) and (12*b*) so as to move the left and right side walls (12*a*) and (12*b*) in the approaching directions, at the same time the bellows (15) is contracted, and thereby the size in the left and right directions (the size in the widthwise direction of the corrugated cardboard sheet (8)) of the air chamber (6) is reduced. On the contrary, in the case where the size of the corrugated cardboard boxes being manufactured is large and hence a single-faced corrugated cardboard sheet (1) having a broad width is fed, one of the feed screw shafts (23) is rotated in the opposite direction to that described above, thereby the respective feed screw shafts (23) coupled via the sprockets (14) and the chain (14') are rotated synchronously, these rotations are transmitted to the left and right side walls (12*a*) and (12*b*) so as to move the left and right side walls (12*a*) and (12*b*) in the separating directions, at the same time the bellows (15) is expanded, and thereby the size in the left and right directions (the size in the widthwise direction of the corrugated cardboard sheet (8)) of the air chamber (6) is enlarged.

As will be apparent from the above description, in the double facer according to the present invention, since in the case where the size of the corrugated cardboard boxes being manufactured is small and hence a single-faced corrugated cardboard sheet having a narrow width is fed into the gap between the belt on the upper side and the heating box on the lower side, the side walls of the air chamber are moved in the widthwise directions so as to adapt to the width size of the single-faced corrugated cardboard sheet and thereby the size of the air chamber in the widthwise direction is reduced, whereas in the case where the size of the corrugated cardboard boxes being manufactured is large and hence a single-faced corrugated cardboard sheet having a broad width is fed, the side walls of the air chamber are moved in the opposite widthwise directions so as to adapt to the width size of the corrugated cardboard sheet and thereby the size of the air chamber in the widthwise direction is enlarged; the pressurized air would not leak out through the gaps between the side walls of the air chamber and the belt on the upper side, and so, production of unacceptable products can be prevented. In addition, there is an advantage that since leakage of the pressurized air as described above can be eliminated, a driving power expense for the pressurized air feed source can be economized.

While a principle of the present invention has been described above in connection to one preferred embodiment of the invention, it is a matter of course that many apparently widely different embodiments of the present invention could be made without departing from the spirit of the present invention.

What is claimed is:

1. A double facer, in which when a single-faced corrugated cardboard sheet and a liner are being pinched and conveyed by a belt on the upper side and a heating box on the lower side, pressurized air is fed from an air chamber onto the back side of said belt to press the single-faced corrugated cardboard sheet and the liner onto the side of said heating box and thereby said single-faced corrugated cardboard sheet and said liner are made to stick to each other; characterized in that there is provided a single air chamber, of which side walls of said air chamber are supported in a movable manner in the width-wise direction of said sheet and a sealing member is disposed in a freely movable manner between said side walls and said belt, wherein the upper edges of the side walls of said air chamber are fixedly secured to bellows which are expansible in the direction of movement of the side walls of said air chamber and which cover the upper surface of said belt on the upper side.

2. A double facer, in which when a single-faced corrugated cardboard sheet and a liner are being pinched and conveyed by a belt on the upper side and a heating box on the lower side, pressurized air is fed from an air chamber onto the back side of said belt to press the single-faced corrugated cardboard sheet and the liner onto the side of said heating box and thereby said single-faced corrugated cardboard sheet and said liner are made to stick to each other; characterized in that two side walls of said air chamber are supported in a movable manner in the width-wise direction of said sheet, wherein the upper edges of the both side walls of said air chamber are fixedly secured to bellows which are expansible in the direction of movement of the side walls of said air chamber and which cover the upper surface of said belt on the upper side.

3. A double facer as claimed in claim 2, wherein air-sealing plates which are slidably held in contact with said belt and which are vertically movable, are provided at the lower edges of the side walls of said air chamber.

* * * * *

UNITED STATES PATENT AND TRADEMARK OFFICE
CERTIFICATE OF CORRECTION

PATENT NO. : 4,889,580

DATED : December 26, 1989

INVENTOR(S) : YUKUHARU SEKI and NORIYASU HARAGUCHI

It is certified that error appears in the above-identified patent and that said Letters Patent is hereby corrected as shown below:

Col. 2, line 62, "singlefaced" should be --single-faced--.

Signed and Sealed this

Twenty-second Day of January, 1991

*Attest:*

HARRY F. MANBECK, JR.

*Attesting Officer*

*Commissioner of Patents and Trademarks*